United States Patent [19]

Meyer

[11] Patent Number: 4,746,524

[45] Date of Patent: May 24, 1988

[54] MICROBIOLOGICALLY-RESISTANT SAUCES AND DRESSINGS AND METHOD FOR THEIR PREPARATION

[75] Inventor: Richard S. Meyer, Tacoma, Wash.

[73] Assignee: Curtice-Burns, Inc., Rochester, N.Y.

[21] Appl. No.: 912,305

[22] Filed: Sep. 25, 1986

[51] Int. Cl.⁴ .......................... A23L 1/24; A23L 1/39
[52] U.S. Cl. ................................ 426/330; 426/330.6; 426/589; 426/602; 426/605; 426/613
[58] Field of Search ............ 426/321, 326, 330, 330.1, 426/330.2, 330.3, 330.4, 330.5, 330.6, 331, 335, 605, 602, 589, 613

[56] References Cited

U.S. PATENT DOCUMENTS

| | | | |
|---|---|---|---|
| 3,736,148 | 5/1973 | Katz | 426/321 |
| 3,769,042 | 10/1973 | Kaplow et al. | 426/331 |
| 3,914,445 | 10/1975 | Pavey | 426/331 |
| 3,922,353 | 11/1975 | Bernotavicz | 426/331 |
| 3,955,010 | 5/1976 | Chozianin et al. | 426/605 |
| 4,143,171 | 3/1979 | Buckley et al. | 426/331 |
| 4,191,783 | 3/1980 | Burkwall et al. | 426/331 |
| 4,291,066 | 9/1981 | Anema et al. | 426/331 |
| 4,352,832 | 10/1982 | Wood et al. | 426/613 |
| 4,520,037 | 5/1985 | Gould et al. | 426/330.6 |
| 4,572,836 | 2/1986 | Bakal | 426/321 |

OTHER PUBLICATIONS

John I. Pitt et al., "Fungi and Food Spoilage", Academic Press, 1985, pp. 383–398.

Primary Examiner—Jeanette Hunter
Attorney, Agent, or Firm—Christensen, O'Connor, Johnson & Kindness

[57] ABSTRACT

Microbiologically-resistant sauces and dressings are prepared by a process of adjusting the pH while also adjusting the water activity of the ingredients of the food product. Preferred values for pH and water activity are described to provide optimal resistance to growth of microorganisms in the food product.

18 Claims, 1 Drawing Sheet

MICROBIOLOGICALLY-RESISTANT SAUCES AND DRESSINGS AND METHOD FOR THEIR PREPARATION

FIELD OF THE INVENTION

This invention relates to food formulations prepared to resist the growth of microorganisms and, particularly, to microorganism-resistant formulations with lowered pH and water activity.

BACKGROUND OF THE INVENTION

Prior methods of formulating food products such as salad dressings, have used large quantities of an acid, such as acetic acid, to reduce microbial growth and, thus, produce a microbiologically stable product. For example, U.S. Pat. No. 4,352,832 describes the use of buffering salts and acetic acid to reduce the pH of a salad dressing product to render the dressing stable. However, the use of relatively high levels of acid tends to impact an undesirable acid "bite" to the food. It is also generally known that foods containing less water are easier to preserve, and exhibit longer shelf-life. Water in food exists in both "bound" and "free" forms. Bound water is not available to act as a solvent or to participate in chemical reactions and, thus, is not available to microorganisms for metabolic activity. Water activity (or $a_w$) provides a measure of the availability of water for chemical reactions and microbial growth. Water activity is related to equilibrium relative humidity (ERH). The water activity of a solution defined in terms of ERH is as follows:

$$a_w = \frac{ERH}{100}$$

ERH may be determined using standard procedures such as the vapor pressure manometric technique.

Microorganisms have a minimum and an optimum $a_w$ for growth. The minimum $a_w$ at which growth can occur is important for determining the level for prevention of microbial growth in food. The minimum $a_w$ values for the growth of various microorganisms are known, for example, the minimum $a_w$ for the growth of most bacteria is from 0.90 to 0.91 $a_w$. The addition of solutes such as various salts may be used to lower the $a_w$.

In the past, knowledge in the art has dictated that foods with relatively high water/activity or pH (low acidity) require preservatives to prevent undesirable microbial growth, for example to prevent botulism. With the current trend toward reducing, and even eliminating the presence of preservatives in food products, there is a need for procedures for treating food products to reduce microbial growth without requiring preservatives, while maintaining a pleasing taste and consistency in the resulting food.

SUMMARY OF THE INVENTION

Accordingly, a method is provided herein for preparing food products which resist the growth of microorganisms therein, by adjusting the pH, and concomitantly adjusting the water activity of the food product. Optimum stabilization of the food product is achieved in accordance with the present invention using pH values corresponding to specific water activity values as outlined in polygon ABCDE of FIG. 1. The pH may be lowered using an acid such as acetic acid, and the decrease in water activity may be accomplished by increasing the amount of solutes, by adding an oil ingredient, or by decreasing the total amount of water in the ingredients used to prepare the food product.

BRIEF DESCRIPTION OF THE DRAWING

A better understanding of the present invention can be derived by referring to the accompanying FIGURE, which is a graph illustrating the bounds of pH and water activity for a microbiologically stable food prepared in accordance with the present invention.

DETAILED DESCRIPTION

Figure 1:
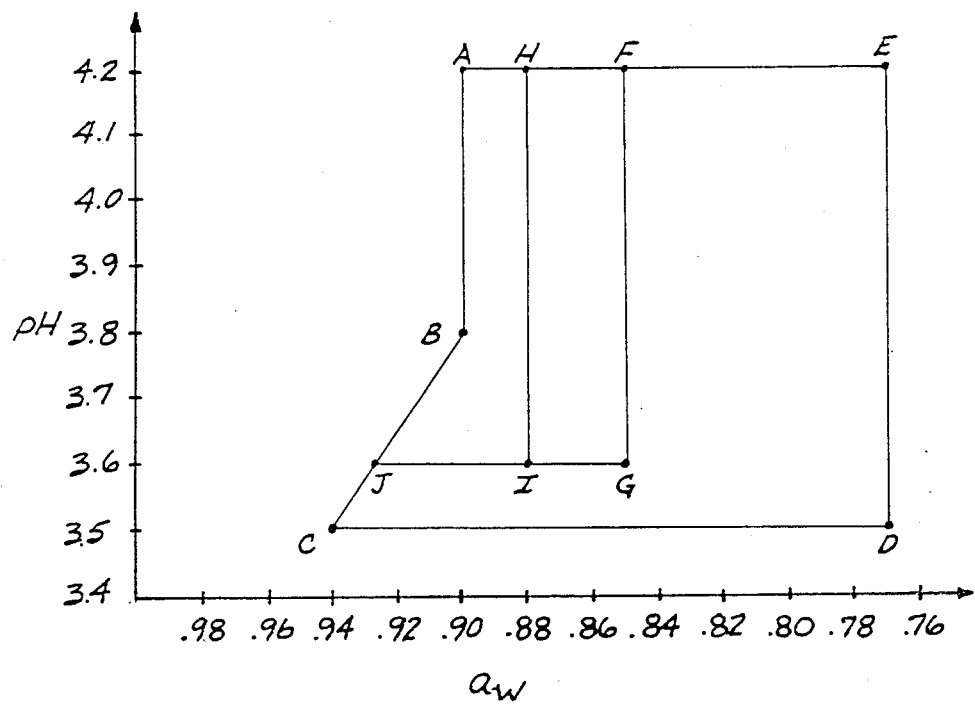

The present invention provides a method for preparing food products which are resistant to the growth of microorganisms and, thus, promote long-term storage of the resulting food products. Surprisingly, we have found that decreasing the water activity while also lowering the pH of the ingredients of the food provides a product which resists microbial contamination. The method comprises lowering the pH of the formulation for the food product to values of pH within the range of approximately 3.5 to approximately 4.2 and lowering the water activity of the formulation to values within the range of approximately 0.77 to approximately 0.94 and that also fall within the polygon ABCDE of FIG. 1. Details of the method are described below.

The products prepared using the methods of the present invention include dressings commonly used on salads, vegetables, sandwiches and other foods and also include sauces, such as barbecue sauces and other condiments, as well as salads and other foods which contain a liquid component, which foods in the past have required the use of preservatives for long term shelf-life.

The water activity of the food product produced using the method described herein may be lowered by manipulating the ingredients used to prepare the food product. Lowering the water activity allows the food product to be maintained at a higher pH so that less acid is required to prevent microbial contamination. The water activity $a_w$ may be decreased, for example, by adding oils, or solutes such as salts, or by decreasing the overall water component of the formulations. Conversely, by lowering the pH, the amount that the water activity has to be decreased in the formulation for the food product to achieve microbial stability is reduced.

The following example is presented to illustrate the present invention and to assist one of ordinary skill in making and using the same. The example is not intended in any way to otherwise limit the scope of the disclosure or the protection granted by the Letters Patent hereon.

EXAMPLE I

The results of varying the pH and water activity (of the ingredients of a food product) on the growth of a bacteria [and yeast] in the food product were studied using the bacteria Lactobacillus fructivorans and the yeast Kluyveromyces sp. common salad dressing spoilage organisms, isolated from fermented salad dressing. Bacterial growth was evaluated after the initial day, and after one and two weeks incubation at 27° C., following an initial inoculation of 6000 colony forming unit (CFU) per gram of dressing. Relative growth levels were determined using standard pour plating techniques. A control dressing used for each experiment was prepared by heating a starch paste consisting of 28.08% water, 10.06% corn syrup, 7.62% vinegar, 4.13% corn starch, 2.23% sugar, 2.15% high fructose corn syrup, 1.55% salt and 0.07% flavorings (all wt. %). Then, without further heating, the additional ingredients set forth in Table 1 were combined with the starch paste.

TABLE 1

| Ingredient | Grams | Weight Percentage (%) |
|---|---|---|
| Starch paste | 558.90 | 55.89 |
| Oil(soybean) | 352.20 | 35.22 |
| Egg yolk | 51.40 | 5.14 |
| Water | 30.20 | 3.02 |
| Vinegar | 7.20 | 0.72 |
| Flavoring | 0.10 | 0.01 |

The pH and $a_w$ were then varied to ascertain the microorganism growth at different pH and $a_w$ levels. The desired pH of the final product was varied by adding acidulant at a level predicted to result in a desired pH, then adjusting, using a pH meter. The desired $a_w$ was then achieved by varying the amount of sugar (sucrose) and salt (sodium chloride) in the starch paste in accordance with the formula: $a_w = 0.97 - 2.91 \times 10^{-3}$ (% sugar) $-0.01$ (% salt), wherein the (% sugar) and the (% salt) are the total weight percent of each of the components present in the final dressing. Growth of the microorganisms Lactobacillus fructivorans and Kluyveromyces sp. in salad dressing over time with variations in pH and $a_w$ is depicted in Tables 2 and 3.

TABLE 2

| | Lactobacillus fructivorans | | | |
|---|---|---|---|---|
| | | | No. Bacteria/Gram (CFU/gm) | |
| | pH | $a_w$ | Day 1 | Week 1 | Week 2 |
| 1. | 3.50 | 0.94 | 19,000 | 3,000 | 0 |
| 2. | 3.50 | 0.93 | 30,000 | 0 | 0 |
| 3. | 3.58 | 0.92 | 55,000 | 750 | 0 |
| 4. | 3.78 | 0.88 | 61,000 | 1,750 | 0 |
| 5. | 3.80 | 0.90 | 75,000 | 3,300 | 0 |
| 6. | 3.82 | 0.92 | 84,000 | 1,800 | 0 |
| 7. | 3.95 | 0.88 | 45,000 | 14,000 | 550 |
| 8. | 4.10 | 0.88 | 60,000 | 49,000 | 400 |

TABLE 3

| | Kluyveromyces sp. | | | |
|---|---|---|---|---|
| | | | No. Bacteria/Gram (CFU/gm) | |
| | pH | $a_w$ | Day 1 | Week 1 | Week 2 |
| 1. | 3.42 | 0.91 | 110 | 0 | 0 |
| 2. | 3.58 | 0.88 | 270 | 40 | 0 |
| 3. | 3.67 | 0.88 | 260 | 240 | 0 |
| 4. | 3.78 | 0.88 | 360 | 100 | 0 |
| 5. | 3.82 | 0.92 | 360 | 30,000 | 30,000 |
| 6. | 3.85 | 0.93 | 370 | 30,000 | 30,000 |
| 7. | 3.91 | 0.87 | 400 | 0 | 0 |

Bacterial growth was suppressed in accordance with the results of the foregoing examples at pHs in the range of from 3.5 to 4.1 when the $a_w$ of the dressing was in the range of from 0.87 to 0.94. It has been found that bacterial growth can be suppressed in accordance with the present invention over an even broader range of pH, from 3.5 to 4.2, and $a_w$, from 0.77 to 0.94. FIG. 1 illustrates the relationship between pH and $a_w$ established for food products using the process of the present invention to provide resistance to the growth of microorganisms. The preferred relationship between pH and $a_w$ is defined by the polygon ABCDE of the FIGURE. A more preferable relationship is defined by the polygon ABJGF and a most preferable relationship is defined by the polygon ABJIH. In the pH range of 3.5 to 3.8, and water activity of 0.90 to 0.94, the upper limit of the water activity is defined by the following formula:

$$pH = -7.5(a_w) + 10.55$$

Thus, surprisingly, it was found that by adjusting the pH, and the $a_w$ to precisely defined ranges, as depicted in FIG. 1, effective resistance to bacterial growth was obtained without the use of preservatives.

The present invention provides a method for preparing food products protected against microbiological contamination. The formulations of this invention include preservative-free, pourable salad dressings with relatively higher pH and lower water activities than most commercially available dressings. Foods prepared using this method also resist the growth of microorganisms without requiring the addition of preservatives. However, preservatives may be included in the ingredients of food products prepared as described herein to further increase shelf life. Chemical additives, such as emulsifying agents, antioxidants, sequestering agents and preservative agents such as sodium benzoate and potassium sorbate may be used to further preserve the formulations described herein for food products to increase the storage time of the products.

Flavoring agents including natural and artifical flavors and various spices, relishes, pastes, purees and cheeses, and artificial and natural colors may also be used in the formulations in amounts which may be readily determined by those skilled in the art. Food products formulated using the method of the present invention thus exhibit a favorable taste without the acidic "bite" of prior acid-stabilized food products, and have a pleasing consistency.

While the present invention has been described in conjunction with the preferred embodiments, one of ordinary skill, after reading the foregoing specifications, will be able to effect various changes, substitutions of equivalents and alterations to the compositions and methods set forth herein. It is therefore intended that the protection granted by Letters Patent hereon be limited only by the appended claims and equivalents thereof.

The embodiments of the invention in which an exlusive property or privilege is claimed are defined as follows:

1. A method for formulating sauces and dressings containing a plurality of ingredients that resist the growth of microorganisms therein comprising lowering the pH and water activity of the ingredients used to prepare the sauces and dressings such that when the ingredients are mixed the product sauces and dressings have a pH and water activity falling within the polygon ABCDE of FIG. 1.

2. The method according to claim 1, wherein the pH is lowered to a pH value within the range of 3.5 to 4.2 when the water activity is lowered to an activity within the range of about 0.77 to about 0.94.

3. The method according to claim 1 wherein the sauces and dressings have a pH and water activity falling within the polygon ABJGF of FIG. 1.

4. The method according to claim 3 wherein the pH is lowered to a pH value within the range of 3.6 to 4.2 when the water activity is lowered to an activity within the range of approximately 0.85 to approximately 0.93.

5. The method according to claim 1 wherein the sauces and dressings have a pH and water activity falling within the polygon of ABJIH of FIG. 1.

6. The method according to claim 5 wherein the pH is lowered to a pH value within the range of 3.6 to 4.2 when the water activity is in the range of approximately 0.88 to approximately 0.93.

7. The method according to claim 1, wherein the pH is lowered by the addition of an acid selected from the group consisting of acetic, lactic, phosphoric, sorbic, citric, gluconic, tartaric, malic and succinic acid.

8. The method according to claim 1, wherein the pH is lowered by the addition of acetic acid.

9. The method according to claim 8, wherein the water activity is lowered by increasing the amount of oil in the ingredients of the sauces and dressings, and lowering the water in the sauces and dressings.

10. The method according to claim 9, wherein the water activity is lowered by increasing the amount of total solutes in the ingredients of said sauces and dressings.

11. The method according to claim 10, wherein the water activity is lowered by increasing the amount of salt in the ingredients of said sauces and dressings.

12. The method according to claim 11, wherein the water activity of the sauces and dressings is lowered by decreasing the relative amount of water in the ingredients of the sauces and dressings.

13. Sauces and dressings which are resistant to the growth of microorganisms having a pH in the range of 3.5 to 4.2 and a water activity in the range of from approximately 0.77 to approximately 0.94, and falling within the polygon ABCDE.

14. Sauces and dressings which are resistant to the growth of microorganisms having a pH in the range of 3.5 to 4.2 and a water activity in the range of from approximately 0.77 to approximately 0.94, the upper limit of said water activity in the range of pH from 3.5 to 3.8 being defined by the formula:

$$pH = -7.5(a_w) + 10.55.$$

15. A method for formulating sauces and dressings that resist the growth of spoilage microorganisms therein comprising lowering the pH and water activity of the sauces and dressings such that the sauces and dressings have a pH and water activity falling within the polygon ABCDE of FIG. 1.

16. The method of claim 1, wherein the plurality of ingredients comprises oil, solutes, salts, and water.

17. Sauces and dressings prepared by the method of claim 2.

18. Sauces and dressings prepared by the method of claim 2, wherein the upper limit of said water activity in the range of pH from 3.5 to 3.8 being defined by the formula:

$$pH = -7.5(a_w) + 10.55.$$

* * * * *

UNITED STATES PATENT AND TRADEMARK OFFICE
CERTIFICATE OF CORRECTION

PATENT NO.  : 4,746,524
DATED       : May 24, 1988
INVENTOR(S) : Richard S. Meyer It is certified that error appears in the above-identified patent and that said Letters Patent is hereby corrected as shown below:

Column 1, line 21:  "impact" should be --impart--

Column 4, line 26:  "artifical" should be --artificial--

Column 5, line 11:  "8" should be --16--

Column 5, line 15:  "9" should be --16--

Column 5, line 22:  "11" should be --16--

Signed and Sealed this

Eighth Day of November, 1988

Attest:

DONALD J. QUIGG

*Attesting Officer*          *Commissioner of Patents and Trademarks*